United States Patent
Snyder

[11] Patent Number: 6,004,648
[45] Date of Patent: Dec. 21, 1999

[54] VENEER LAMINATE AND METHOD OF MANUFACTURE

[75] Inventor: Jonathan Douglas Snyder, Benton, Ark.

[73] Assignee: Arkansas Face Veneer Co., Inc., Benton, Ark.

[21] Appl. No.: 08/797,572

[22] Filed: Feb. 7, 1997

[51] Int. Cl.⁶ .................................................. B32B 5/12
[52] U.S. Cl. ................ 428/106; 52/311.2; 144/329; 144/332; 144/346; 144/348; 156/71; 156/256; 156/273.7; 156/297; 428/105; 428/109; 428/114; 428/212; 428/213
[58] Field of Search ................... 428/106, 105, 428/109, 114, 212, 213; 144/329, 332, 346, 348; 52/311.2; 156/71, 256, 297, 273.7

[56] References Cited

U.S. PATENT DOCUMENTS

| | | | |
|---|---|---|---|
| 1,314,519 | 9/1919 | Howard | 428/106 |
| 1,412,510 | 4/1922 | Christmas | 428/106 |
| 2,220,898 | 11/1940 | Franklin | 428/106 |
| 2,706,164 | 4/1955 | Hervey | 154/45 |
| 4,204,900 | 5/1980 | Kohn | 156/255 |
| 4,219,060 | 8/1980 | Hasegawa | 144/213 |
| 4,376,003 | 3/1983 | Elbez | 428/106 |
| 5,234,747 | 8/1993 | Walser | 428/106 |
| 5,418,034 | 5/1995 | McGuire | 428/106 |

OTHER PUBLICATIONS

"Tech Exchange—Warp in laminated substrates can be reduced with proper material choice, preparation and handling", *Wood Digest*, 1997, p. 47.

The Architectural Woodwork Institute "Architectural Woodwork Quality Standards, Guide Specifications and Quality Certification Program, Fifth Edition", 1988, p. 22–35.

Hardware Plywood & Veneer Association "American National Standard for Hardwood and Decorative Plywood", 1995.

*Primary Examiner*—Nasser Ahmad
*Attorney, Agent, or Firm*—Thompson Hine & Flory LLP

[57] ABSTRACT

A two-ply or even-ply veneer laminate panel created by the steps of: pre-flexing a substrate veneer ply sufficiently to substantially break the grains of the substrate ply, and bonding the substrate ply to a face veneer ply. Preferably, the substrate ply is pre-flexed in a direction parallel to the direction that the grains of the substrate ply run. And preferably, the grains of the face ply are oriented in a substantially perpendicular direction to the grains of the substrate ply.

30 Claims, 2 Drawing Sheets

VENEER LAMINATE AND METHOD OF MANUFACTURE

BACKGROUND

The present invention relates to veneer panels and, more particularly, to even-ply or two-ply wood veneer laminate panels and their methods of manufacture.

Wood veneer is commonly applied to the outer surfaces of furniture, doors or other architectural woodwork and to provide aesthetically pleasing wood grain appearance to such products. Because the veneer sheets used are thin, they are susceptible to breaking, warping or other damage, and therefore are bonded to one or a plurality of substrate layers to provide stability and strength. Typical substrate materials include other veneer sheets, paper, cloth, particle board, fiber board, reconstituted wood or fiber based board, and the like. Such multi-layer panels are referred to as laminate panels, and the composite structure of a laminate panel constructed of a veneer face bonded to one or a plurality of veneer substrates will be hereinafter referred to as a "veneer laminate panel."

A significant problem occurring with veneer laminate panel products is warping caused by unbalanced panel construction. After different types and thicknesses of veneer laminate sheets are rigidly bonded together, moisture content changes often occur to one or all of the sheets. In response to such changes in moisture content, the dimensions of the particular sheets will start to change which causes stresses to accumulate in the sheets, resulting in warping of the laminate panels when the stresses become excessive and are no longer balanced between the various layers.

A method of compensating for such a tendency is to construct the veneer laminate panels to be symmetrical from the centerline of the panel (with respect to the panel's thickness). Veneer laminate panels are typically constructed of an odd number of layers or plies and are arranged and selected in a combinations of species, thicknesses, and moisture contents to produce a symmetric and balanced panel. All inner plies, except the innermost (central) ply, occur in pairs and have the same thickness and grain direction; and each ply of each pair is placed on opposites sides of the inner-most (central) ply. Further, the grain of each ply is oriented at right angles to the grain of each adjacent ply. The use of an even number of plies (such as a two-ply laminate) is not prohibited. But the even ply laminate must contain identical layers of adjacent veneers with parallel grain orientation.

Accordingly, a need exists for an even-ply or two-ply veneer laminate that permits the use of a substantially unlimited range of combinations of face veneer plies and substrate veneer plies, that does not require the adjacent plies to be absolutely balanced and symmetrical, and that does not require the adjacent plies to have grains running in parallel directions.

SUMMARY

The present invention provides a method for fabricating an even-ply or two-ply veneer laminate that substantially prevents warping in the veneer laminate panel, comprising the steps of: pre-flexing the substrate ply sufficiently to substantially break or weaken the cellular bonds between the long grain fibers of the substrate ply, and then bonding the substrate ply and face ply together. Preferably, the grains of the face ply are oriented in a substantially perpendicular direction to the grains of the substrate ply; and further, the substrate ply is preferably pre-flexed in a direction parallel to the direction that the grains of the substrate ply run.

Utilizing this method the even-ply or two ply veneer laminate is able to utilize a substrate ply which is not "balanced" or identical to the face ply. Accordingly, the substrate ply can be a thicker and less expensive veneer sheet compared to the decorative and thinner face veneer ply.

Accordingly, it is an object of the invention to provide an even-ply or two-ply veneer laminate that allows a wide range of combinations of veneer substrate and face plies; an even-ply or two-ply laminate that substantially reduces the warping of the veneer laminate; and an even-ply or two-ply veneer laminate that is relatively simple and inexpensive to fabricate. These and other objects and advantages of the present invention will be apparent from the following description, the accompanying drawings and the appended clients.

DETAILED DESCRIPTION

Figure 1:
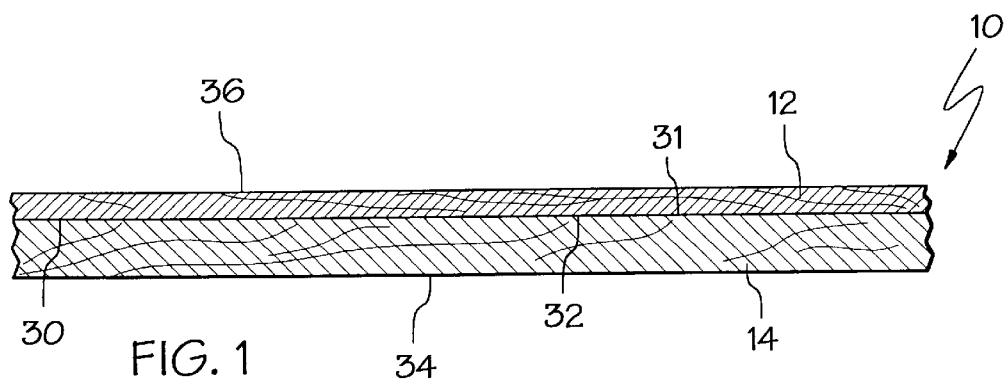
FIG. 1 is a cross sectional side elevational view of a two ply laminate in accordance with the present invention.

As shown in FIG. 1, a two-ply laminate 10 of the present invention includes a face-veneer ply 12 and a substrate-veneer ply 14 bonded to each other. Each of the veneer plies 12, 14 are cut from a log or partial log using a rotary cut method, a plain slicing method, a quarter slicing method, a half round slicing method, a rift cut method, or any other veneer cutting method as is known to one of ordinary skill in the art.

The face ply 12 is typically a decorative veneer sheet, normally having a thickness ranging from 1.588 mm. (1/16 in.) to 0.462 mm. (1/55 in.), and the substrate ply 14 is typically a less expensive and thicker veneer sheet, normally ranging from approximately 0.907 mm. (1/28 in.) to 4.233 mm. (1/6 in.). However, it should be apparent to one of ordinary skill in the art, that it is within the scope of the present invention to utilize any thickness selected for the face ply 12 or the substrate ply 14.

Figure 4:
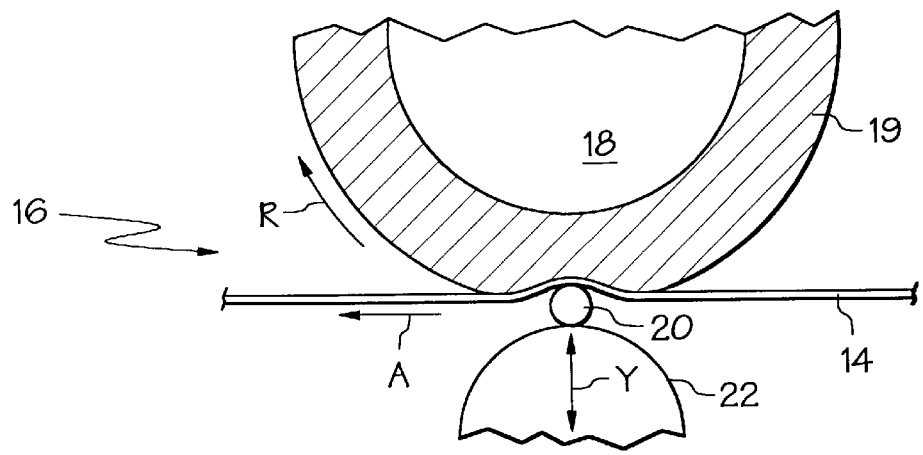
FIG. 4 is a schematic, side elevational view of a flexing machine for use with the present invention.
Figure 5:
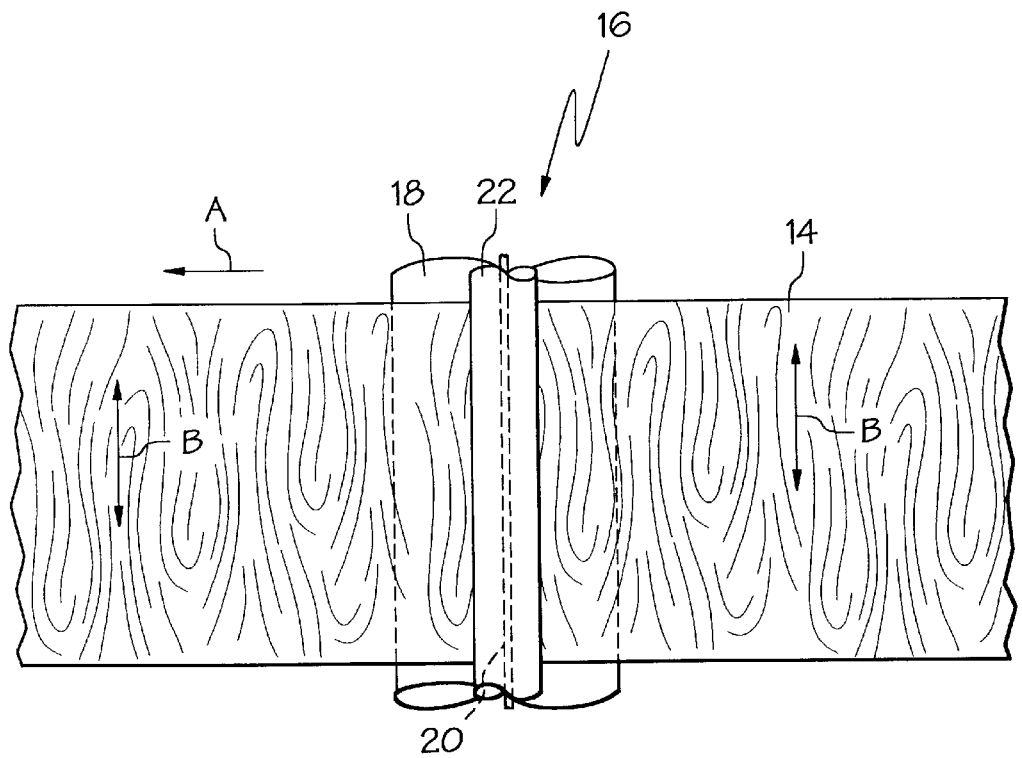
FIG. 5 is a schematic, bottom plan view of the flexing machine of FIG. 4.

As shown on FIGS. 4 and 5, the substrate ply 14, prior to being bonded to the face ply 12, is flexed on a conventional flexing machine 16. The flexing machine 16 contains a drive roll 18 and a flexing rod 20. The flexing rod 20 has a diameter of approximately 6.350 mm. (1/4 in.). The drive roll 18 is surrounded by a flexible rubber coating 19, approximately 38.6 cm. (15½ in.) in diameter, and rotates in a direction R. The rotation R of the drive cylinder forces the substrate ply 14 to move between the drive roll 18 and flexing rod 20 in the direction A. A support roll 22 is positioned adjacent to the flexing rod 20, opposite the drive roll 18, and can reciprocate with respect to the flexing rod 20 in the directions of Y. The support roll 22 has a diameter of approximately 35.56 cm. (15 in.).

During the flexing operation, the support roll is adjusted towards the drive roll 18 to put sufficient pressure on the flexing rod 20, causing the flexing rod to be pushed somewhat into the rubber coating 19 of the drive roll. The substrate ply 14 is fed-in between the drive roll 18 and the flexing rod 20, such that the substrate ply must bend around, and be flexed around, the flexing rod 20 as the substrate ply is driven by the drive roll 18 in the direction A. Thus the degree to which the support roll 22 presses the flexing rod 20 into the rubber coating 19 is the degree necessary to sufficiently break or weaken the bonds between the long grain wood fibers of the substrate ply.

As shown in FIG. 5, the flexing machine 16 is used to flex the substrate ply in a direction substantially parallel to the direction in which the grains of the substrate ply run. Thus, the substrate ply 14 is fed in between the flexing components of the flexing machine such that the grains of the substrate ply, running in the direction indicated by arrows B, are broken with the long fibers of the grain. Accordingly, the substrate ply 14 is fed into the flexing machine 16 such that the grains of the substrate ply are running in a direction B substantially perpendicular to the direction A that the substrate ply is being driven through the flexing machine 16.

At this point, it should be apparent to one of ordinary skill in the art that any manual, automated or semi-automated method for flexing the substrate ply 14 in a direction substantially parallel to the directions B of the grains, such as to substantially break or weaken the cellular bonds between the long grain fibers, running in a direction B, of the substrate ply will fall within the scope of the present invention.

Once the substrate ply 14 has been pre-flexed as discussed above, the surfaces of the substrate ply 14 may be sanded, or otherwise smoothed, to remove or reduce irregularities on the outer surfaces of the substrate ply. Furthermore, prior to bonding the substrate ply 14 to the face ply 12, the two plies are preferably dried such that they have a target moisture content ("humidity") of approximately 6%. However it is within the scope of the invention that the humidity of the two plies range from about 4% to about 20%, and it is not imperative, although preferred, that the humidities of the two plies equal each other.

Figure 2:
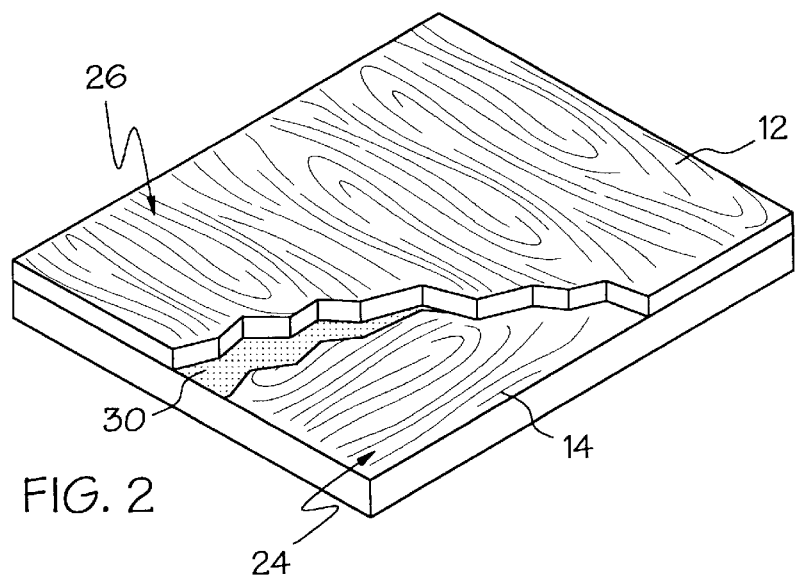
FIG. 2 is a perspective view of a first embodiment of the two ply laminate, having a portion of the face veneer ply cut away to show the substrate veneer ply bonded thereto.
Figure 3:
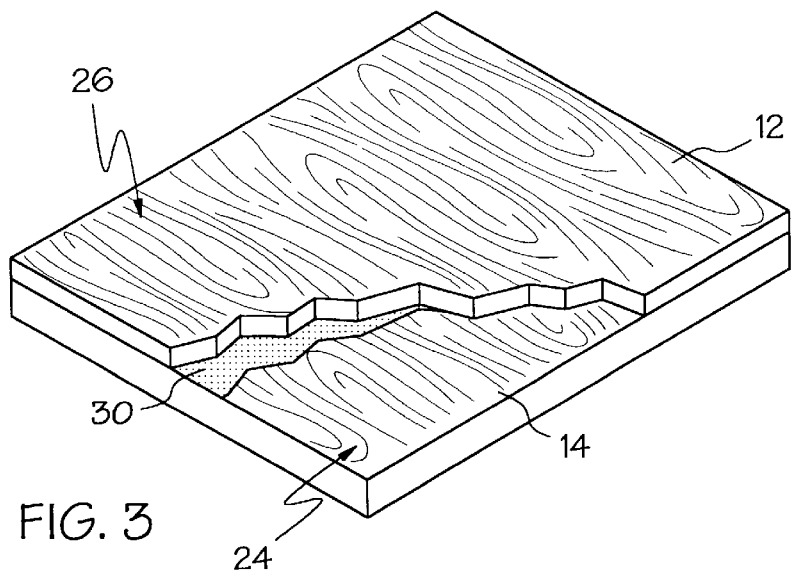
FIG. 3 is a perspective view of a second embodiment of the present invention, having a portion of the face veneer ply cut away to show the substrate veneer ply bonded thereto.

As shown in FIGS. 1, 2 and 3, a layer of an adhesive material 30 is next positioned between the face ply 12 and the substrate ply 14. Preferably a layer of adhesive 30 is applied to an inner surface 31 of the substrate ply and/or to an inner surface 32 of the face ply. Suitable adhesives for use with the present invention can be any suitable dry sheet glue, liquid glue, polyvinyl-acetate glue or other glue as is commonly known in the art. Preferably, a sheet glue such as Dri-Bond glue, commercially available through Eastman Kodak Company, is used.

As shown in FIG. 2, prior to bonding the substrate ply 14 and face ply 12 to each other, the plies are oriented with respect to each other such that the grains 24 of the substrate ply run in a direction which is substantially nonparallel to the grains 26 of the face ply. Preferably the grains 24 of the substrate ply run substantially perpendicular to the grains 26 of the face ply. However, a shown in FIG. 3, it is within the scope of the present invention that the substrate ply 14 and face ply 12 are oriented with respect to each other such that the grains 24 of the substrate ply run in a direction which is substantially parallel to the grain 26 of the face ply.

Once oriented, the two plies are bonded to each other by applying approximately 105,487 kg/m² (150 lbs/in²) of pressure to the outer surface 34 of the substrate ply and the outer surface 36 of the face ply, at a temperature normally ranging from 135° C. to 147° C. (275° F. to 300° F.), depending upon the adhesive used. Through a combination of heat and pressure this bonding process is normally performed. When liquid glues are used the bonding can be performed with pressure only in a "cold pressing" operation.

All of the above embodiments depict a veneer laminate having two plies, a single face ply 12 and a single substrate ply 14. It is also within the scope of the invention, and it is foreseeable, that the present invention allows for any number of plies (even or odd) be used to create the laminate panel. Thus having described the invention in detail and by reference to the drawings, it will be apparent that modifications and variations are possible without departing from the scope of the invention as defined in the following claims.

What is claimed is:

1. A veneer laminate comprising:

a veneer substrate ply having long grain fibers running in a first direction; and a veneer face ply bonded to said substrate ply, said face ply having a grain running in a second direction;

wherein bonds between said long grain fibers of said substrate ply are substantially broken or weakened, while said grain of said face ply is not broken, thereby minimizing warping of said veneer laminate.

2. The veneer laminate of claim 1, wherein second direction is substantially non-parallel to said first direction.

3. The veneer laminate of claim 2, wherein:

said substrate ply has an inner surface facing said face ply;

said face ply has an inner surface facing said substrate ply; and a layer of adhesive is positioned between said face ply inner surface and said substrate inner surface.

4. The veneer laminate of claim 3, wherein at least one of said substrate inner surface or said face ply inner surface is substantially coated with said adhesive.

5. The veneer laminate of claim 4, wherein said substrate ply is substantially smooth, resulting from a sanding operation performed after pre-flexing the ply.

6. The veneer laminate of claim 5, wherein said substrate ply has a moisture content of approximately 6% immediately prior to being bonded with said face ply.

7. The veneer laminate of claim 1 wherein:

said substrate ply has a thickness ranging from approximately 0.907 millimeters (1/28 inches) to 4.233 millimeters (1/6 inches); and said face ply has a thickness ranging from approximately 1.588 millimeters (1/16 inches) to 0.462 millimeters (1/55 inches).

8. The veneer laminate of claim 1, wherein said second direction is substantially perpendicular to said first direction.

9. A method for constructing a veneer laminate comprising the steps of:

flexing a substrate ply, having grains running in a first grain direction, sufficiently to substantially break the grains of the substrate ply and minimize warping of said veneer laminate; and after said flexing step, bonding the substrate ply to a veneer face ply, the face ply having unbroken grain running in the second direction.

10. The method of claim 9, wherein the face ply has grains running in a grain direction, and the method further comprises the step of orientating the grain direction of the face ply to be substantially non-parallel to the grain direction of the substrate ply.

11. The method of claim 10, further comprising the step of smoothing a surface of the substrate ply between said flexing and said bonding steps.

12. The method of claim 10, wherein the substrate ply has an inner surface for facing the face ply and the face ply has an inner surface for facing the substrate ply, and the method further comprises the step of applying an adhesive to at least one of the substrate ply inner surface or the face ply inner surface.

13. The method of claim 10, wherein the substrate ply has an inner surface for facing the face ply and the face ply has an inner surface for facing the substrate ply, and the method further comprises the step of positioning a layer of adhesive between the substrate ply inner surface and the face ply inner surface.

14. The method of claim 9, wherein said flexing step involves flexing the substrate ply in a direction substantially parallel to the grain direction of the substrate ply.

15. The method of claim 14, wherein said flexing step involves flexing the substrate on a flexing machine.

16. The method of claim 9, further comprising the step of reducing the moisture content of the substrate ply to about 6% before said bonding step.

17. The method of claim 9, wherein:
the substrate ply has a thickness ranging from approximately 0.907 millimeters (1/28 inches) to 4.233 millimeters (1/6 inches); and
the face ply has a thickness ranging from approximately 1.588 millimeters (1/16 inches) to 0.462 millimeters (1/55 inches).

18. The method of claim 9, wherein the substrate ply has an outer surface opposite the inner surface of the substrate ply and the face ply has an outer surface opposite the inner surface of the face ply, and said bonding step includes the steps of:
applying approximately 105,487 kg/m$^2$ (150 lbs/in$^2$) of pressure to the outer surfaces of the face ply and the substrate ply; and
heating the face ply and the substrate ply to approximately 135° C. to 147° C. (275° F. to 300° F.).

19. The method of claim 9, wherein the face ply has grains running in a grain direction, and the method further comprises the step of orientating the grain direction of the face ply to be substantially perpendicular to the grain direction of the substrate ply.

20. The method of claim 9, wherein the face ply has grains running in a grain direction, and the method further comprises the step of orientating the grain direction of the face ply to be substantially parallel to the grain direction of the substrate ply.

21. A veneer laminate product created by a process including the steps of:
flexing a substrate ply, having grains running in a first grain direction, sufficiently to substantially break the grains of the substrate ply and minimize warping of said veneer laminate; and
after said flexing step, bonding the substrate ply to a veneer face ply, the face ply having unbroken grain running in the second direction.

22. The veneer laminate product of claim 21, wherein the face ply has grains running in a grain direction, and the process further includes the step of orientating the grain direction of the face ply to be substantially non-parallel to the grain direction of the substrate ply.

23. The veneer laminate product of claim 22, wherein said flexing step involves flexing the substrate ply in a direction substantially parallel to the grain direction of the substrate ply.

24. The veneer laminate product of claim 23, wherein the substrate ply has an inner surface for facing the face ply and the face ply has an inner surface for facing the substrate ply, and the process further includes the step of applying an adhesive to at least one of the substrate ply inner surface or the face ply inner surface.

25. The veneer laminate product of claim 23, wherein the substrate ply has an inner surface for facing the face ply and the face ply has an inner surface for facing the substrate ply, and the process further includes the step of positioning a layer of adhesive between the substrate ply inner surface and the face ply inner surface.

26. A veneer laminate consisting essentially of:
a veneer substrate ply, having a grain running in a first direction and a thickness ranging from approximately 0.907 millimeters (1/28 inches) to 4.233 millimeters (1/6 inches); and
a veneer face ply bonded to said substrate ply, and having a grain running in a second direction, and a thickness ranging from approximately 1.588 millimeters (1/16 inches) to 0.462 millimeters (1/55 inches);
wherein said grain of the substrate ply is broken, thereby minimizing warping of said veneer laminate; and
wherein said the grain face ply is not broken.

27. The veneer laminate of claim 26, wherein said second direction is substantially non-parallel to said first direction.

28. A decorative veneer laminate panel comprising:
a veneer substrate ply, having a grain running in a first direction; and
a decorative veneer face ply bonded to said substrate ply, said face ply having a grain running in a second direction;
wherein said grain of said substrate ply is broken, while said grain of said face ply is not broken.

29. The decorative veneer laminate panel of claim 28 wherein:
said substrate ply has a thickness ranging from approximately 0.907 millimeters (1/28 inches) to 4.233 millimeters (1/6 inches); and
said face ply has a thickness ranging from approximately 1.588 millimeters (1/16 inches) to 0.462 millimeters (1/55 inches).

30. The decorative veneer laminate panel of claim 29, wherein said second direction is substantially non-parallel to said first direction.

* * * * *